(12) United States Patent
Steigerwald et al.

(10) Patent No.: US 7,400,061 B2
(45) Date of Patent: Jul. 15, 2008

(54) SOFT SWITCHED SECONDARY SIDE POST REGULATOR FOR DC TO DC CONVERTER

(75) Inventors: Robert L. Steigerwald, Burnt Hills, NY (US); John S. Glaser, Niskayuna, NY (US)

(73) Assignee: Lockheed Martin Corporation, Bathesda, MD (US)

( * ) Notice: Subject to any disclaimer, the term of this patent is extended or adjusted under 35 U.S.C. 154(b) by 352 days.

(21) Appl. No.: 11/005,773

(22) Filed: Dec. 7, 2004

(65) Prior Publication Data
US 2006/0119185 A1    Jun. 8, 2006

(51) Int. Cl.
*H02J 3/00* (2006.01)

(52) U.S. Cl. .............................. 307/17; 363/16; 363/98; 363/132

(58) Field of Classification Search .................. 307/17; 363/16, 17, 95, 98, 131, 132
See application file for complete search history.

(56) References Cited

U.S. PATENT DOCUMENTS

| 4,864,479 A | 9/1989 | Steigerwald et al. |
| 5,038,264 A | 8/1991 | Steigerwald |
| 6,504,267 B1 * | 1/2003 | Giannopoulos ............... 307/31 |
| 2002/0001210 A1 * | 1/2002 | Kuranuki et al. ............... 363/98 |

OTHER PUBLICATIONS

Bill Andreycak, "Designing a Phase Shifted Zero Voltage Transition (ZVT) Power Converter", Mar. 25, 1993, pp. 3-1 to 3-15.

* cited by examiner

*Primary Examiner*—Michael Sherry
*Assistant Examiner*—Daniel Cavallari
(74) *Attorney, Agent, or Firm*—Howard IP Law Group

(57) ABSTRACT

A high frequency, full bridge, resonant DC to DC converter provides a main DC output voltage that is regulated by adjusting the phase shift of the input power to a main input transformer and at least one additional DC output voltage that is regulated on the secondary side of the power input transformer. A main DC output voltage is regulated by a full bridge resonant switching converter with lossless switching of input power devices. At least one additional secondary winding on the transformer supplies a second DC output voltage that is regulated independently of the main DC output voltage. Two switching devices are used for each auxiliary DC output to regulate each auxiliary output voltage by adjusting the length of the on time of the pulses from the transformer's auxiliary secondary windings. Soft switching techniques are used to ensure that the switching devices turn on when the voltage across them is effectively zero.

7 Claims, 4 Drawing Sheets

SOFT SWITCHED SECONDARY SIDE POST REGULATOR FOR DC TO DC CONVERTER

TECHNICAL FIELD

The invention relates generally to DC-to-DC converters and more particularly, to regulation of a DC output voltage on the secondary side of a power input transformer.

BACKGROUND

DC-to-DC converters are known for converting a first DC voltage to a second, regulated DC voltage. Typically, a first DC voltage is converted to a series of AC pulses that are then rectified and regulated to create a second DC voltage. In many instances the AC pulses are input to the primary winding of a transformer and the secondary pulses, which may be at a higher or lower voltage than the input voltage, are rectified and regulated, the regulation often involving variation of the input pulse width. One very efficient DC-to-DC converter design is a full-bridge, resonant power converter. Such a converter is described in Steigerwald U.S. Pat. No. 4,864,479 issued Jul. 4, 1989. The converter of the Steigerwald patent is capable of operating at high frequencies, e.g. 1 MHz, and achieving high power densities. The Steigerwald converter employs a zero-voltage switching technique to produce the DC output voltage. Furthermore, zero voltage switching allows for a highly efficient conversion of power and reduced switching noise.

One way to obtain multiple output voltages from a DC-to-DC converter, such as the aforementioned full bridge resonant converter, is to provide additional windings on the output transformer. One main DC output voltage can be regulated according to the method taught in the '479 patent. In order to obtain auxiliary regulated output voltages, however, a high degree of coupling among all transformer windings is important. At high frequencies, tight coupling among all transformer windings can be difficult to achieve, resulting in output voltages that do not track closely enough. Thus it is desirable to have a regulation means for auxiliary outputs that is not closely coupled to the regulation means for the main output.

One means of regulating auxiliary DC output of a zero voltage switching power supply is described in Steigerwald, U.S. Pat. No. 5,038,264, issued Jun. 11, 1990. The '264 Steigerwald patent employs linear series-pass regulators to regulate the auxiliary voltages. A series-pass regulator, however, may be less efficient than desired, since power is wasted in the drop in voltage from the input to the output of the regulator. A more efficient scheme is desirable that would employ a switching regulator to regulate each auxiliary output and would advantageously synchronize the auxiliary regulation with the switching waveform of the secondary side of the main power transformer.

SUMMARY OF THE INVENTION

According to an aspect of the present invention, there is provided a DC-to-DC converter with a phase-shifted lossless resonant bridge conversion and regulation of a main DC output voltage and to provide regulation for at least one auxiliary secondary output voltage supplied by additional secondary windings of the transformer supplying the main output. According to another aspect, efficient lossless soft switching of the devices used to regulate the auxiliary output voltages is achieved. In one configuration, a high frequency, full bridge, resonant converter provides a main DC output voltage that is regulated by adjusting the phase shift of the input power to a main input transformer and at least one additional DC output voltage that is regulated on the secondary side of the power input transformer.

A full bridge resonant switching converter is operated substantially in the manner described in Steigerwald, '479 to efficiently produce a first DC output voltage. The magnetizing and leakage inductances of the high frequency transformer exchange energy between the transformer and the switching device output capacitances such that the energy stored in the device capacitances is returned to the DC source rather than dissipated in the device.

At least one additional secondary winding on the transformer produces a second set of pulsed DC voltages, the pulses being in phase with the pulses on the secondary winding supplying the main DC output voltage. Two switching devices are used for each auxiliary DC output to regulate each auxiliary output voltage by adjusting the length of the ON time of the pulses from the transformer's auxiliary secondary windings. Soft switching techniques are used to ensure that the switching devices turn on when the voltage across them is effectively zero.

An improved multiple output DC-to-DC converter includes a transformer with a primary and secondary windings wherein the transformer includes inherent inductances in series therewith. The converter comprises an inverter having a plurality of controllable switching devices Q1, Q2 and Q3, Q4 adapted to be connected in parallel across a DC supply. Each of the controllable switching devices includes an inherent diode portion D1-D4 in inverse parallel therewith, and each of the controllable switching devices further includes an inherent capacitance C1-C4 in parallel therewith. A first junction J1 is between a first pair of the controllable switching devices Q1, Q2; and a second junction J2 is between a second pair of the controllable switching devices Q3, Q4. The primary winding of the transformer is connected between the first and second junctions. The transformer includes a first secondary winding N2 inductively coupled to the primary winding, the first secondary winding connected to a rectifying circuit supplying a first controllable DC voltage to a first load. A first control circuit is adapted to turn the first pair and the second pair of the controllable switching devices on and off at times which result in a substantially lossless transfer of energy between the inherent inductances and the inherent capacitances. The transformer includes a second secondary winding N3 that is center-tapped and inductively coupled to the primary winding. The center tap of the second secondary winding forms a reference potential Vout2(-) for an auxiliary output voltage Vout2 and a first end of the second secondary transformer winding N3(a) is connected to the anode side of a first diode D5 and a second end of the second secondary transformer winding N3(b) is connected to the anode side of a second diode D6. The cathode end of the first diode connects to a first controllable switching device, and the cathode end of the second diode connects to a second controllable switching device; the other ends of the first and second switching devices forming a junction J3 at which a second controllable DC output voltage Vout2 is supplied to a second load. A second control circuit is adapted to turn on and off the first and second controllable switching devices at times that result in the regulation of the second controllable DC output voltage.

DETAILED DESCRIPTION

Figure 1:
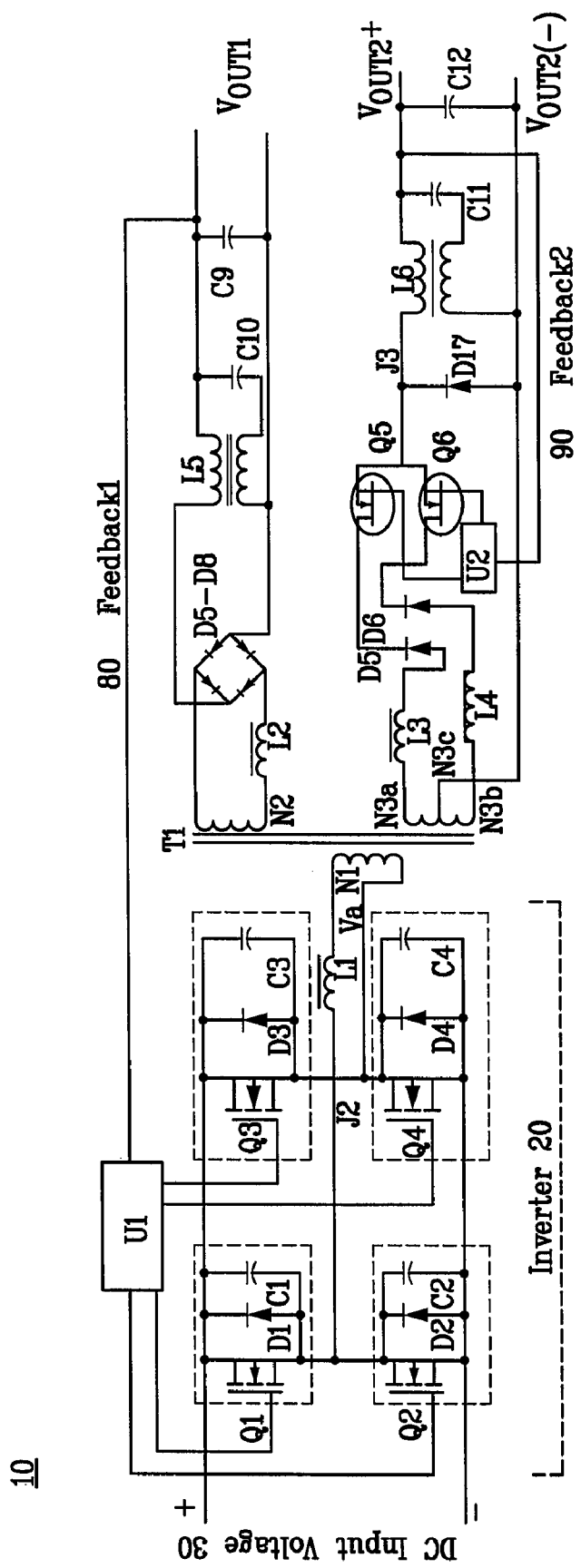
FIG. 1 is a schematic diagram 10 of a multiple output phase shifted full bridge resonant DC-to-DC converter in accordance with a preferred embodiment of the invention.

FIG. 1 shows the schematic diagram of an exemplary embodiment of the invention.

An improved multiple output DC-to-DC converter is shown including a transformer T1 with a primary N1 and secondary N2, N3 windings. Inductances relating to leakage effects and that are inherent in the transformer are depicted as L1-L4. The converter has an inverter for transforming the DC supply voltage 30 into a pulse-width modulated quasi-square wave. The inverter is comprised of controllable switching devices Q1, Q2 and Q3, Q4, which in the embodiment shown are power Field Effect Transistors (FETs). Each of the field effect transistors has an inherent capacitance in parallel with its source and drain. The capacitances for each of the FETs are shown as C1-C4. Each FET also has an inherent diode, sometimes called a body diode in parallel with the source and drain. The diodes for each of the FETS are shown in FIG. 1 as D1-D4.

The drain of FET Q1 and the source of FET Q2 are connected at a junction J1. The drain of FET Q3 and the source of FET Q4 are connected at a junction, J2. Junctions J1 and J2 are connected across the primary winding N1 of transformer T1.

Controller U1 is connected to Q1-Q4 and has an input which is a feedback voltage 80 from the first regulated DC output, Vout1.

FETS Q1-Q4 and controller U1 switch the DC input voltage 30 to produce an alternating, quasi-square wave voltage Va across the primary windings of transformer N1. An oscilloscope trace of the primary winding voltage (140) is substantially shown in FIG. 2. The first DC output of the converter, Vout1 is controlled in conventional fashion by varying the pulse width of the quasi-square wave drive voltage to N1. This operation is controlled by controller U1, which maintains the level of the signal Feedback 1 by controlling the on and off times of FETS Q1 to Q4. Voltage Vout1 is regulated by adjusting the width of the pulses supplying voltage to primary winding N1. This produces a quasi-square wave secondary voltage on windings N2 and N3. This voltage is rectified by diodes D5-D8 and filtered by inductor L5 and capacitor C9 to produce the first, or main, output voltage, Vout1. Vout1 is fed back to U1 via feedback connection 80, which enables U1 to adjust the on and off times of Q1-Q4 to regulate Vout1 to a predetermined desired level.

The switching of Q1-Q4 is timed such that the inherent leakage inductance L1 of the transformer winding N1 and magnetizing inductance of winding N1 (not shown) exchange energy between the transformer and the switching device output capacitances such that energy stored in the FET inherent capacitances C1-C4 is returned to the DC source (30) rather than dissipated in the switching devices. This lossless resonant switching and the timing required to achieve this effect in a phase-shifted full bridge converter for the main output (Vout1) of the schematic shown in FIG. 1 is known to those skilled in the art and can be accomplished as described in Steigerwald, U.S. Pat. No. 4,864,479.

Transformer T1 also has a second secondary winding N3 that is center-tapped and inductively coupled to the primary winding, N1. The second secondary winding also has associated inherent leakage inductances, shown in FIG. 1 as L3 and L4.

The center tap of the second secondary winding, N3c forms a reference potential Vout2(-) for an auxiliary output voltage Vout2. The first end N3a of secondary winding N3 is connected to the anode side of diode D5 and the second end N3b of secondary winding N3 is connected to the anode side of a second diode D6;

The cathode of D5 is connected to a controllable switching device Q5, which in the depicted embodiment is an FET and D5 is connected to the source Q5. The cathode end of D6 is connected to the source of FET Q6. The drains of FETs Q5 and Q6 form a junction J3, at which a second controllable DC output voltage Vout2 is supplied to a second load through filter components L6, C11 and C12.

Controller U2, which has as an input Feedback 2 (90) of Vout2, controls the switching of FETs Q5 and Q6 so as to regulate voltage Vout2.

Figure 2:
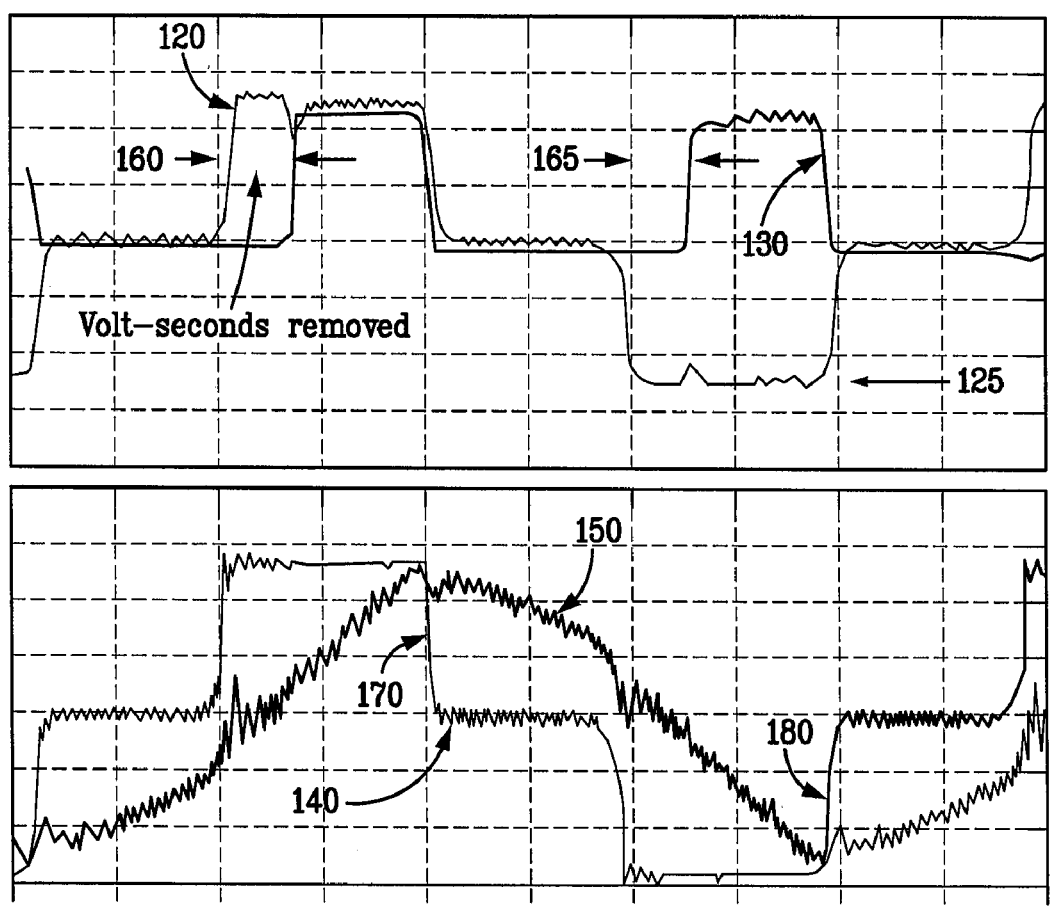
FIG. 2 is an oscilloscope trace 100 plotting voltage and current versus time in a test circuit built according to the schematic in FIG. 1, plot image showing the output of the auxiliary secondary winding at N3a (120), the output of one of the switching devices after the pulse length from N3a has been shortened by holding Q5 off for an initial period of time (160), the primary side input voltage across N1 (140) and the primary side input current (150).

In the exemplary embodiment depicted in FIG. 1, the regulation of Vout2 is achieved as follows. A quasi square wave having the same duty cycle as that produced at primary windings N1 (shown in FIG. 2 at 140) is also produced across windings N3a and N3b (shown in FIG. 2 at 120). This voltage is rectified by diodes D5 and D6 in conventional full-wave fashion, but only if gate-controlled switches (FETs) Q5 and Q6 are conducting. By delaying the turn on of Q5 and Q6, a shorter portion of the quasi square wave is rectified and the output voltage is reduced. This delayed turn on is shown in FIG. 2 at 160, which is the time between the rising edge of the output of the voltage at N3a (trace 120) and the output of Q5 (trace 130). Voltage regulation is achieved by feeding back the output voltage (Vout2) to a control circuit (U2) that drives Q5 and Q6 and varies the amount of shortening of the quasi square wave.

Figure 3:
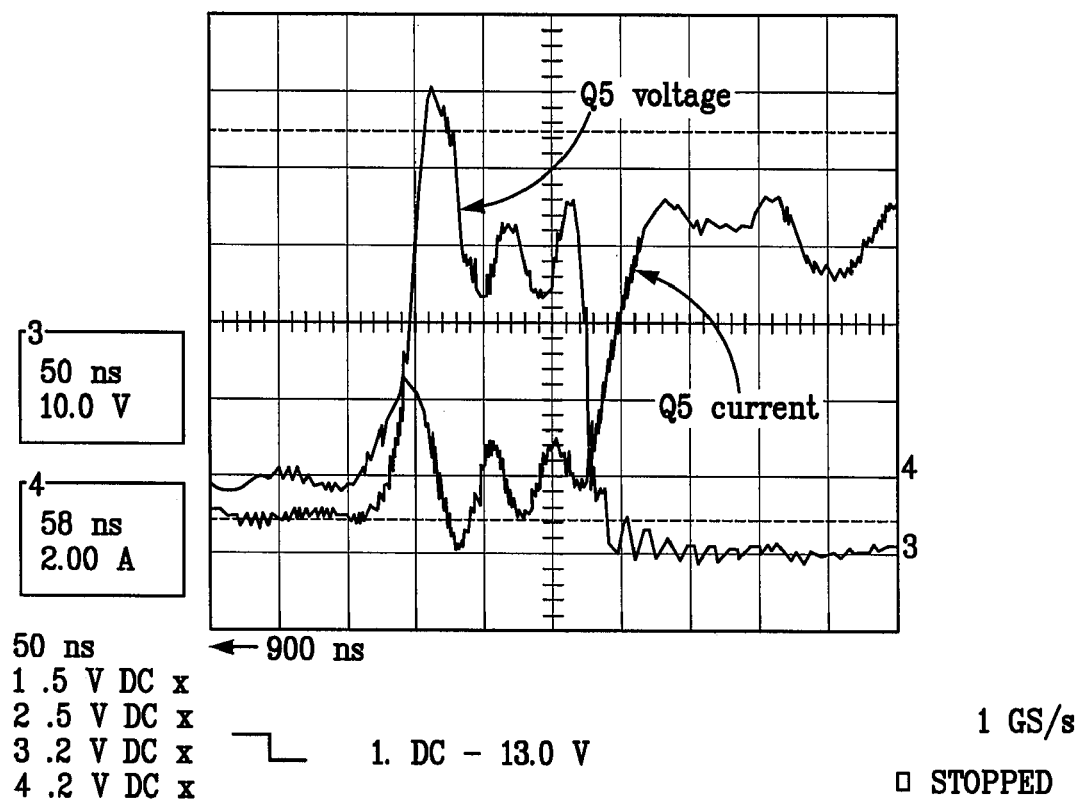
FIG. 3 is an oscilloscope trace illustrating voltage and current waveforms for Q5 during on switch transition.

The switching of Q5 and Q6 is accomplished with at or near a zero voltage crossing across the devices, resulting in an efficient "soft switching" transition. This aspect is accomplished as follows. When the voltage across N3 is such that the dotted ends of N3a and N3b just become positive, the voltage will not be applied to the output of Q5 until the device is turned on. After an appropriate leading-edge delay, U2 will command Q5 to turn on. Full current will not appear across Q5 instantaneously, however, because the instant Q5 is closed, no current will flow through the windings of N3 due to the inherent inductance L3 of the transformer. Thus the voltage across Q5 immediately drops to zero before any current begins to build up, thus assuring that no power is lost in Q5 during the switch transition. This is shown in the scope trace of FIG. 3.

Figure 4:
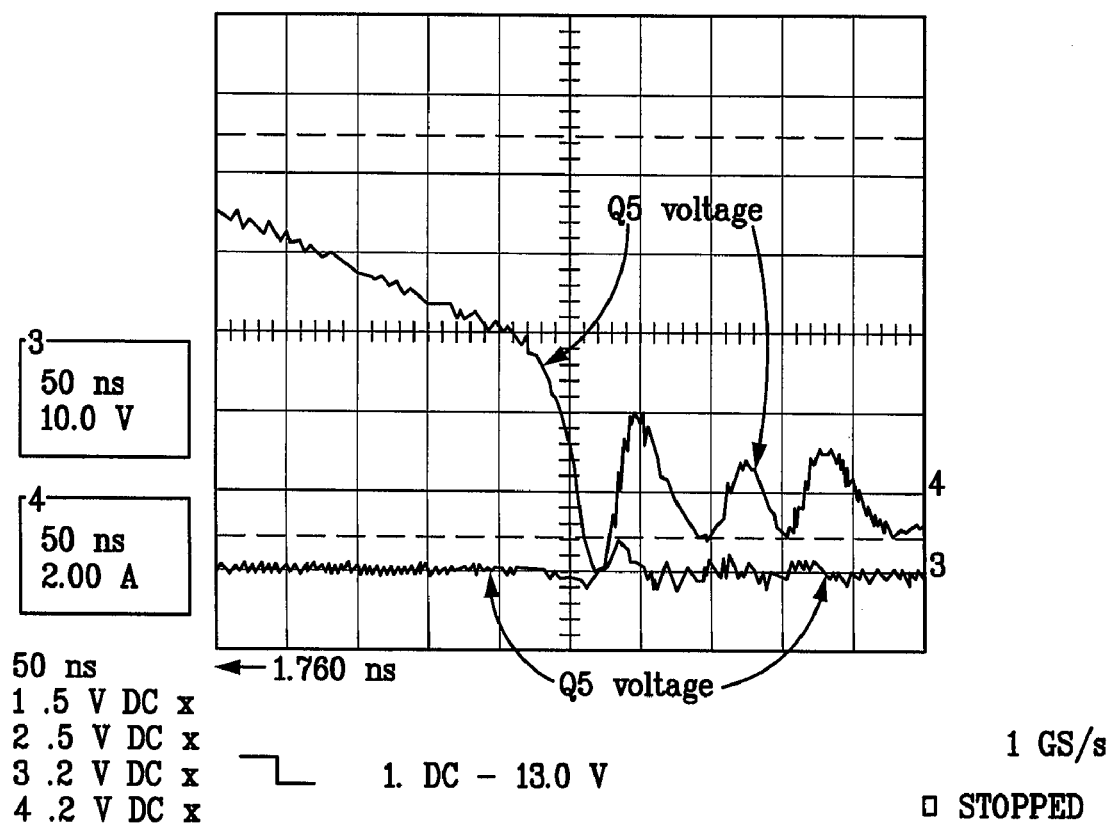
FIG. 4 is an oscilloscope trace illustrating voltage and current waveforms for Q5 during off switch transition.

Q5 will conduct until the voltage on N3a and N3b reverses due to the operation of the primary side bridge, i.e. when voltage V(a) reverses (to voltage level 125 on FIG. 2). When this transition occurs, the un-dotted ends of N3a and N3b become positive. A negative voltage at N3a will cause current in Q5 and D5 to stop flowing (due to the blocking effect of D5) as shown in the scope trace of FIG. 4. Thus, Q5 can be turned off at any time thereafter without voltage across it, again a soft-switched transition. Meanwhile, Q6 is turned on after an appropriate delay off the leading edge (165) to supply current to the load on this part of the quasi square wave cycle. As was the case for the turn on of Q5, this is also a lossless transition.

The output Vout2 is regulated by adjusting the turn on delay for Q5 and Q6. Because the switch transitions take place with effectively zero voltage across the switches, high efficiency operation at high switching frequencies is possible, thus maintaining the advantages of the Phase Shifted Resonant Bridge on the primary side of the transformer.

In yet another aspect, the interaction between the control loop for the main output voltage (effected through Feedback 1 and U1 in FIG. 1) and the control loop for the auxiliary voltage (Feedback 2 and U2) can be minimized by timing the ON time for Q5 and Q6 off the trailing edge of the quasi-square wave produced at N1 (shown in FIG. 2 at 170 and 180). In this manner, when the trailing edge the main voltage loop is modulated to regulate the main voltage (Vout1), the leading edge of the auxiliary output regulator will be delayed by an equivalent amount, which will leave a constant volt-second product at the output of the leading-edge modulator in the auxiliary voltage control loop.

Because the regulation of Vout2 is achieved by shortening the quasi-square wave is produced at secondary winding N3, the winding ratios of the transformer must be such that there is sufficient voltage at N3 to supply the required output Vout2, when the pulse width of the primary drive circuit is at its narrowest, accounting for the full range of pulse widths that the primary drive circuit will produce in order to regulate Vout1.

The foregoing discussion of the invention has been presented for purposes of illustration and description. Further, the description is hot intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A multiple output DC-to-DC converter including a transformer with primary and secondary windings wherein said transformer includes inherent inductances in series therewith, said converter comprising:
   an inverter having a plurality of controllable switching devices and adapted to be connected in parallel across a DC supply, each of said controllable switching devices including an inherent diode portion in inverse parallel therewith, each of said controllable switching devices further including an inherent capacitance in parallel therewith;
   a first junction between a first pair of said controllable switching devices;
   a second junction between a second pair of controllable switching devices;
   the primary winding of said transformer being connected between said first and second junctions;
   said transformer including a first secondary winding inductively coupled to said primary winding, said first secondary winding connected to a rectifying circuit supplying a first controllable DC voltage to a first load;
   a first control means adapted to turn said first pair and said second pair of said controllable switching devices on and off at times which result in a transfer of energy between said inherent inductances and said inherent capacitances;
   said transformer including a second secondary winding that is center-tapped and inductively coupled to said primary winding;
   the center tap of said second secondary winding forming a reference potential for an auxiliary output voltage and a first end of said second secondary transformer winding connected to the anode side of a first diode and a second end of said second secondary transformer winding connected to the anode side of a second diode;
   the cathode end of said first diode connecting to a first controllable switching device, the cathode end of said second diode connected to a second controllable switching device, the other ends of said first and second switching devices forming a junction at which a second controllable DC output voltage is supplied to a second load;
   a second control means adapted to turn on and off said first and second controllable switching devices at times that result in the regulation of said second controllable DC output voltage.

2. The converter according to claim 1 wherein each of said controllable switching devices comprises a field effect transistor.

3. The converter according to claim 1 wherein said second control means comprises:
   an input to sense said second controllable DC output voltage;
   a plurality of outputs for turning off and on said first and second controllable switching devices so as to control said second controllable DC output voltage;
   said outputs for turning off and on said first and second controllable switching devices to make such transitions at times that ensure reduced energy loss switching of said first and second controllable switching devices.

4. The converter according to claim 3 wherein said means for turning off and on said first and second controllable switching devices being adapted to make such transitions such that said control of the second controllable DC output voltage is not directly dependent of voltage waveforms created by said first control means.

5. The converter according to claim 1, comprising additional secondary windings that are center tapped and circuitry associated with each additional secondary winding for rectification and regulation of the voltage of each additional secondary winding in accordance with the means for regulation of the output of said second secondary winding.

6. A method of controlling the voltage output of said second secondary winding of the converter of claim 1, said method comprising the steps of:
   delaying the turn on of said first controllable switching device for a first predetermined interval sufficient to ensure that said first controllable switching device is on for a sufficient period of time to allow a desired voltage to be developed at said junction of the first and second controllable switching devices;
   turning said first controllable switch off after the voltage at the anode of the diode connected to said first controllable switch has gone negative with respect to said center tap on said second secondary winding;
   delaying the turn on of said second controllable switching device for a second predetermined interval sufficient to ensure that said second controllable switching device is on for a sufficient period of time to allow said desired voltage to be developed at said junction of the first and second controllable switching devices;

turning said second controllable switch off after the voltage at the anode of the diode connected to said second controllable switch has gone negative with respect to said center tap on said second secondary winding;

controlling the timing of the turn on of said first and second controllable switches by reference to the voltage waveforms generated by said first control means such that regulation of said second controllable DC output voltage is not affected by regulation of said voltage output of said first secondary winding;

and repeating said steps of said method continuously.

7. An improved DC-to-DC converter of the type having a transformer with primary and secondary windings wherein said transformer includes inherent inductance in series therewith, said converter comprising:

an inverter having a plurality of controllable switching devices adapted to be connected in parallel across a DC supply, each of said controllable switching devices including an inherent diode portion in inverse parallel therewith, each of said controllable switching devices further including an inherent capacitance in parallel therewith;

a first junction between a first pair of said controllable switching devices;

a second junction between a second pair of said controllable switching devices;

the primary winding of said transformer being connected between said first and second junctions;

said transformer including a first secondary winding inductively coupled to said primary winding, said first secondary winding connected to a rectifying circuit supplying a first controllable DC voltage to a first load;

a first control means adapted to turn said first pair and said second pair of said controllable switching devices on and off at times which result in a transfer of energy between said inherent inductances and said inherent capacitances;

said transformer including a second secondary winding that is center-tapped and inductively coupled to said primary winding;

the center tap of said second secondary winding forming a reference potential for an auxiliary output voltage and a first end of said second secondary transformer winding connected to the anode side of a first diode and a second end of said second secondary transformer winding connected to the anode side of a second diode;

the cathode end of said first diode connecting to a first controllable switching device, the cathode end of said second diode connected to a second controllable switching device, the other ends of said first and second switching devices forming a junction at which a second controllable DC output voltage is supplied to a second load;

a second control means adapted to turn on and off said first and second controllable switching devices at times that result in the regulation of said second controllable DC output voltage.

* * * * *